United States Patent [19]

Hirasawa et al.

[11] Patent Number: 5,291,613
[45] Date of Patent: Mar. 1, 1994

[54] METHOD FOR EXECUTING A CONTROL INSTRUCTION IN A MULTI-COMPUTER SYSTEM

[75] Inventors: Shigeki Hirasawa, Kawasaki; Kinji Mori, Machida; Masayuki Orimo, Kawasaki; Hiroshi Fujise, Yokohama; Masuyuki Takeuchi, Fujisawa; Hitoshi Suzuki, Owariasahi, all of Japan

[73] Assignee: Hitachi, Ltd., Tokyo, Japan

[21] Appl. No.: 724,802

[22] Filed: Jul. 2, 1991

[30] Foreign Application Priority Data

Jul. 3, 1990 [JP] Japan .................... 2-175636

[51] Int. Cl.$^5$ .................. G06F 11/28; G06F 15/02
[52] U.S. Cl. .................... 395/800; 364/265.6; 364/944.6
[58] Field of Search ............ 371/53, 57.1, 59, 60; 395/575, 800

[56] References Cited

U.S. PATENT DOCUMENTS

| | | | |
|---|---|---|---|
| 3,571,581 | 3/1971 | Kaus | 371/53 |
| 3,644,888 | 2/1972 | Marino | 371/57.1 |
| 4,161,277 | 7/1979 | Steiner | 371/16.4 |
| 4,208,008 | 6/1980 | Smith | 371/57.1 |
| 4,387,420 | 6/1983 | Singhi | 371/29.1 |
| 4,814,982 | 3/1989 | Weir | 364/DIG. 1 |

*Primary Examiner*—David Y. Eng
*Attorney, Agent, or Firm*—Antonelli, Terry, Stout & Kraus

[57] ABSTRACT

In a multi-computer system in which a plurality of computers connected to each other through a transmission medium share a process to be carried out under relationships among a method performed by these computers executing a control instruction, characterized as; while the plurality of computers each have specific control instruction storage means for storing instructions having influence on normal operations of the multi-computer system, when any of the plurality of computers defects an input instruction corresponding to one stored in the specific control instruction storage means, determines the status of the shared process being carried out by other computers in connections to the self-computer, and uses the result of the determination in the execution of the detected control instruction.

11 Claims, 4 Drawing Sheets

METHOD FOR EXECUTING A CONTROL INSTRUCTION IN A MULTI-COMPUTER SYSTEM

BACKGROUND OF THE INVENTION

1. Field of the Invention

The present invention relates to a method for executing a control instruction in a multi-computer system, and is particularly concerned with a method for executing a computer control instruction in a manner suitable for preventing the system from executing a control instruction likely to cause a failure and thus for improving the reliability of the system.

2. Description of the Prior Art

Today, computers are widely used, and their reliability is a serious matter.

Due to such causes such as operators' careless pressing of keys and/or switched and, an inappropriate control instruction mistakes in programming input to a process in the middle of execution can lead to a computer's malfunction.

For example, the pressing of the power switch by simple operational mistake cuts off the power, likely to cause such damage as the loss of data being processed during execution and the destruction of a program in the middle of its execution.

To prevent such cutoff of the power by a careless pressing of the power switch, some conventional methods for controlling power OFF control instructions in a computer system do not permit turning off of the power switch for a stand-alone computer when the computer is performing a process in its CPU, as found in Japanese Patent Application Laid-Open No. 1-263811.

As for master-slave computer systems, such a method is explained on pages 46 to 49 of "HITAC L-70 System Overview" by Hitachi, Ltd. In this one, a master computer manages the power for a plurality of slave computers, and the power for the master is never cut off before all the managed power supplies for the slaves are cut off.

Apart from the power switch, a control signal such as a reset signal also causes a computer to stop a process in the middle of execution. Therefore, some conventional methods attempt to prevent a careless pressing of the reset switch, which issues a reset signal, by giving an elaborate location to the switch. In other conventional methods, systems ignore a reset signal itself if by checking they find out that the reset switch is pressed at inappropriate time.

Today, as data handled by computers increases in amount and importance, computers need to speed up their processing and improve their reliability. To meet such requirements, a multicomputer system has been developed, which is a distributed processing system for data processing operation shared by a plurality of computers. In this system, the distribution of loads helps to maintain the performance of each computer and also to speed up the entire processing by the whole system and further to handle the occurrence of a failure to one of the computers by using another computer as a backup to carry out the processing in place of the failing computer, an improvement of the reliability of the system.

In such a multi-computer system, since processing efficiency is increased by distributing the processing operation to computers according to the amount of data to be processed and thereby dividing loads at busiest time, a sudden cutoff of the power for computers connected to the system is likely to stop the processing that they have been working on, having received an apportioned processing workload from other computers, leading to data loss or system failure.

For a system composed of computers connected to each other, prevention of the cutoff of the power due to a careless pressing of the power switch is presented by such a prior art attempt as shown on pages 46 to 49 of "HITAC L-70 System Overview" by Hitachi, Ltd.

In this attempt, however, the power for slave computers is permitted to be cut off regardless of their relationship to the master computer. Therefore, for instance, even when a slave computer is functioning as a workstation and running a program on the master, the power for the slave can be cut off by mistakenly setting the power switch on the slave to OFF. For this reason, this method for managing the power switch has had no use in multi-computer systems.

In other words, applying conventional methods to multi-computer systems has the disadvantage that there is no operation for checking the status of other related computers being performed before cutting off the power which leads to the interruption of communication between computers and the imposition of a harmful influence on the consistency of resources.

Moreover, this conventional application has the disadvantage that similar problems are caused by the inappropriate input and execution of control instructions such as a reset instruction.

SUMMARY OF THE INVENTION

A primary objective of the invention is, accordingly, to provide a computer control instruction execution method whereby a computer checks its own operating status as well as that of other computers before executing a control instruction so as to prevent the interruption of communication between computers and the occurrence of inconsistency to the resources used between a plurality of computers and thereby to further improve the reliability of multi-computer systems as well as eliminate the above disadvantages of conventional methods.

To achieve the above-mentioned objective, a primary feature of the present invention is that each of the plurality of computers composing a multi-computer system has a specific control instruction storage unit for storing, in advance, a group of specific control instructions which affect the multi-computer system. Furthermore any of the plurality of computers the detects the input of a same control instruction corresponding to one of the control instructions stored in any of the specific control instruction storage units, determines the status of a process being performed relatively by other computers connected to itself through a transmission line and then uses the result of the determination in order to execute the control instruction or not.

A second features of the present invention is that a computer which has detected a control instruction further detects that this control instruction is the same as one stored in one of the specific control instruction storage units, then decides whether there is an process being performed through the relationship between itself and other computers connected to itself through the transmission line and then uses the result of the determination in order to execute the control instruction or not.

A third feature of the present invention is that, after it is determined that there is a process being performed through the relationship between a computer which has detected a control instruction and other computers connected to that computer through the transmission line, the computer further determines the status of this process being performed relative to the other computers and then uses the result of the determination in order to execute the control instruction or not.

A fourth feature of the present invention is that the computer which has detected a control instruction still further determines its own operating status and then uses the determination results of the decision in order to execute the control instruction.

A fifth feature of the present invention is that a power OFF instruction to turn off the power for a computer is stored in the specific control instruction storage unit and that, when each determination result grants permission for executing the power OFF instruction, the execution is carried out.

Now, the features of the present invention will be described more specifically.

According to the present invention, when a control instruction is input to a computer, the computer searches its specific control instruction storage unit to find out whether or not this input is a control instruction capable of having such a disruptive influence, such as causing a failure, on computers connected to the system.

When the computer detects that the input is the same control instruction as one stored in the specific control instruction storage unit, the computer determines whether or not there is any process being performed through the relationship between itself and other computers.

If the computer determines that there is a process being performed, it further determines the status of this process being performed relative to other computers.

If the determination is that other computers are still performing the process relatively, the self-computer delays the execution of the control instruction. If the decision is the other way round, namely, that the other computer has finished the relatively performed process, the self-computer executes the control instruction.

In this way, the execution of a control instruction is controlled by checking the operating status of the computers performing a process through their mutual relationships and by determining the mutual influence the computers have on each other due to the execution of the control instruction.

For example, when it is detected by any computer that a power OFF control instruction is input by the pressing of the power switch, the computer checks its relationship with other computers and its own status and that of the other computers in terms of processing operation. Then, the computer uses the result of this checking to select between the actual cutoff of the power and the delay of such cutoff.

This prevents any sudden stops of communication between computers and the occurrence of inconsistency to the resources used between computers.

BRIEF DESCRIPTION OF THE DRAWINGS

In the accompanying drawings.

DETAILED DESCRIPTION OF THE PREFERRED EMBODIMENTS

Figure 1:
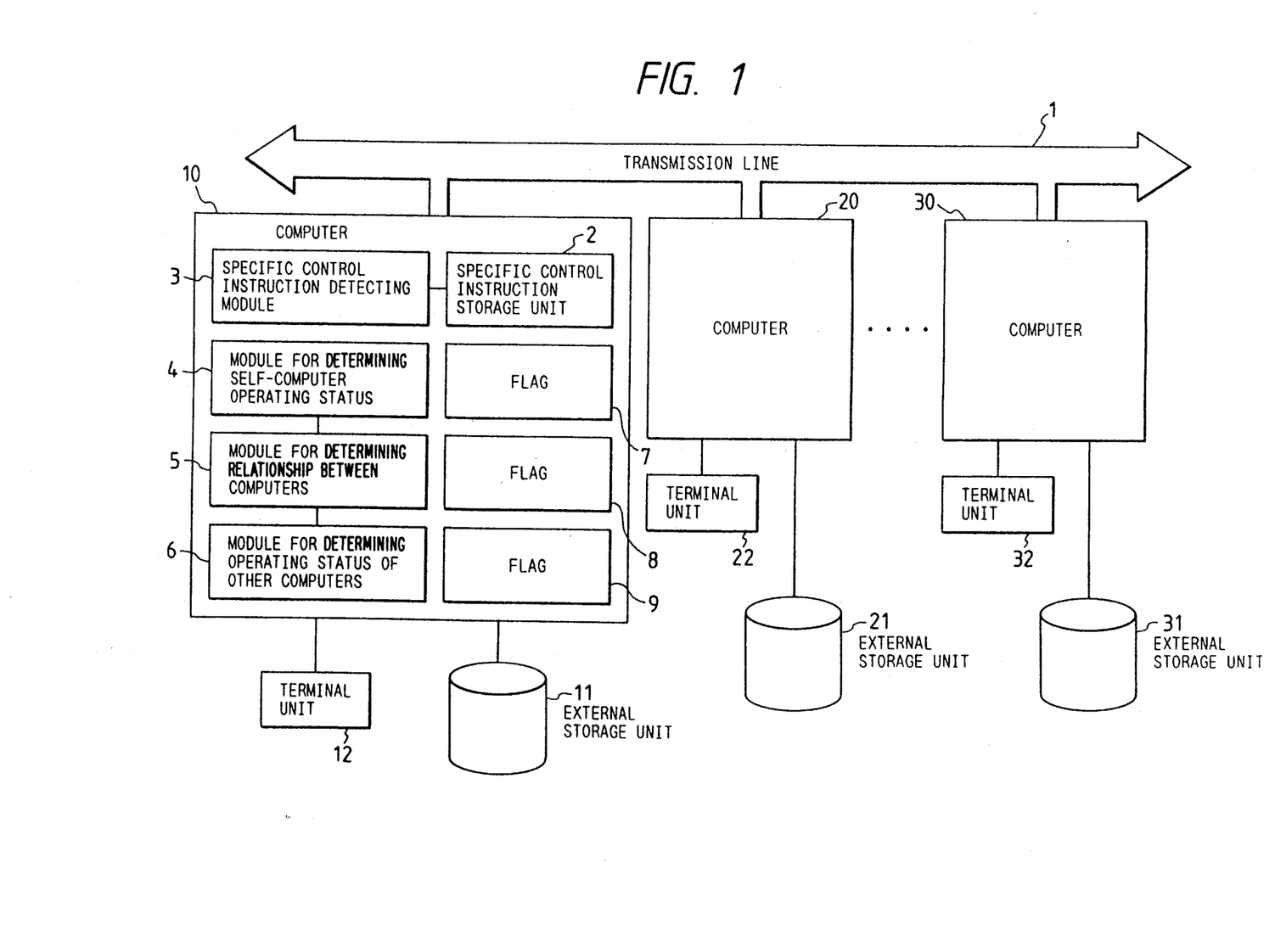
FIG. 1 is a block diagram of the configuration of a multi-computer system which is suitable for carrying out a first embodiment of the present invention.

With particular reference to the drawings and first to FIG. 1, a block diagram shows the configuration of a multi-computer system which is suitable for carrying out a first embodiment of the present invention.

A multi-computer system is composed of computers 10, 20 and 30 which have their respective external storage units 11, 21 and 31 and respective terminal units 12, 22 and 32 and are connected to each other through a transmission line 1.

The computers 10, 20 and 30 receive data from and send data to each other through the transmission line 1.

In this embodiment, each of the computers 10, 20 and 30 have the virtual terminal function. It is the function of connecting computers as if there were no transmission line 1 in between and thereby making it possible that using the terminal unit on a computer to control another computer does not differ in operation from using the latter computer's own terminal unit.

One case in which such a virtual terminal function is employed is the use of the terminal unit 12 to control the computer 20. In this case, though the terminal unit 12 is under the control of the computer 10, during employment of the above-mentioned virtual terminal function of the terminal unit 12 connected through the transmission line 1 can work as if it were the terminal unit on the computer 20. The use of having the terminal unit 12 run a program on the computer 20 will be described more specifically now. Normally, when the computer 10 is started up, a task of managing the terminal unit 12 (terminal management task) is activated on the computer 10. This terminal management task transfers the key input from the terminal unit 12, to the user program, and outputs the output of the user program to the terminal unit 12. To employ the virtual terminal function, two more tasks are needed. Namely, a virtual terminal client task is needed on the side of the terminal unit 12, and a virtual terminal server task on the side of the computer 20. During the employment of the virtual terminal function, the terminal management task handles the client task as a user program and transfers key input to the client task. The client task transfers the key input to the server task by way of the transmission line 1. The server task, functioning the same way as the terminal management task with regards to the user program, transfers key input to the user program. The order is reversed when the user program has its output on the screen of the terminal unit 12, namely, the output is displayed after the transfer in the following order: the user program, the server task, the client task, the terminal management task and the terminal unit 12.

Each of the computers 10, 20 and 30 is, as exemplified by the computer 10 in the drawing, composed of modules for performing operations in accordance with the present invention.

To go into details, each computer is cmoposed of a specific control instruction storage unit 2 for storing, in advance, specific control instructions such as a power OFF instruction and reset instruction likely to have a disrupted influence like a failure on computers connected to the system, a specific control instruction detecting module 3 for detecting the input of a specific control instruction, a module 4 for determining the operating status of a self-computer, namely the computer 10, a module 5 for determining the operation relationship between computers performing processes through their relation, a module 6 for determining the operating status of other computers and flags 7 to 9 for indicating whether or not execution of the corresponding specific control instructions such as a power OFF instruction, reset instruction and task termination instruction is permissible.

Composed in the manner described above, the computers 10, 20 and 30 perform the following processing operations in accordance with the present invention:

When the power is turned on, the flags 7 to 9 are set to "1" so as to reject the execution of each specific control instruction.

When the power switch or the reset switch is pressed owing to the user's negligence during processing carried out through the relationship between the computer 10 and the computers 20 and 30, the specific control instruction detecting module 3 searches the specific control instruction storage unit 2 and detects that the instruction, e.g., a reset instruction, is a specific control instruction.

Then, the module 4 for determining self-computer operating status checks the status of the operation of the computer 10 itself. If the computer 10 is found to be in a status allowing for the execution of the specific control instruction, e.g., a reset instruction, then the module 5 for determining the operating relationship between computers relatively performing processes determines the relationship of the computer 10 with the other computers 20 and 30, in other words, determines whether or not there is any process being performed through the relation between the computer 10 and the computers 20 and 30.

When it is determined that there is a process being performed, the module 6 for determining the operating status of other computers determines the status of processing by the computers 20 and 30. If it is found that the computers 20 and 30 have finished the relatively performed process, the corresponding flags 7 to 9 are changed from "1" to "0", and the detected specific control instruction is executed.

In this embodiment, as understood from the above, the execution of a specific control instruction is controlled on the basis of checking not only the status of the processing by a computer but the relationship of the computer to other computers working on performing processes through this relationship and also the status of the processing by the other computers.

Now, the operation of a multi-computer system according to the present invention will be described in more detail which responds to the pressing of the power switch.

Figure 2:
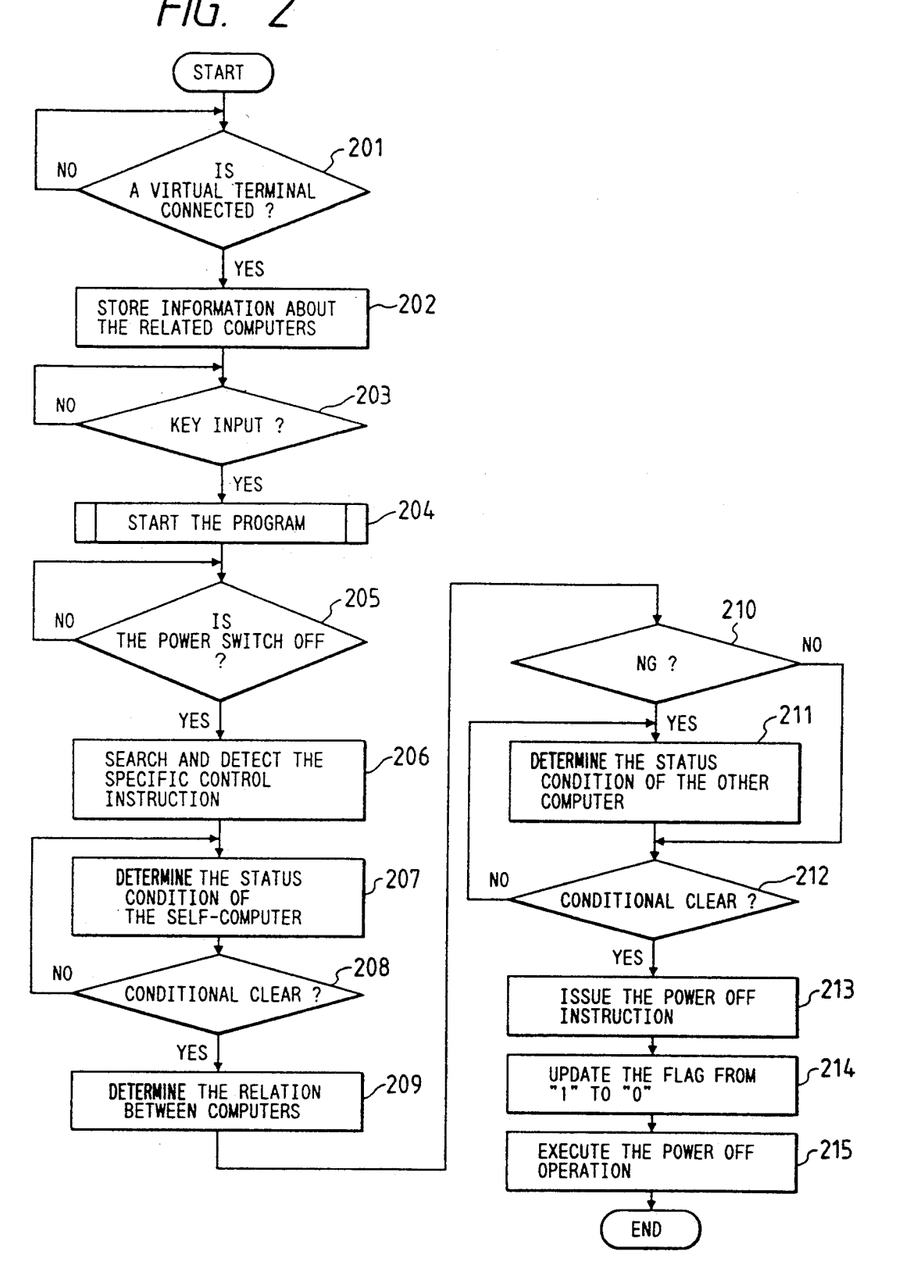
FIG. 2 is a flowchart of a processing operation, embodying the present invention, which is performed by the computer of FIG. 1.

FIG. 2 is a flowchart of a processing operation, embodying the present invention, which is performed by the computer of FIG. 1.

This embodiment, which is the operation of processing in response to the pressing of the power switch for the computer 10 of FIG. 1, will be described based on the configuration of the multi-computer system of FIG. 1.

In this embodiment, the computers 10, 20 and 30 of FIG. 1 are designed in hardware specifications so that the power can be turned off only when the power switch is set to off with the flag 7 set to "0". The flag 7 has the initial value "0" for the turning on of the power, changed to "1" by a power on instruction and to "0" by a power off instruction.

First, when the terminal unit 12 is connected as a virtual terminal to the computer 20 (at step 201), the computer 10, by means of the virtual terminal function as described earlier, stores information about the computer 20 as that about a computer related to itself (at step 202). At this time, the computer 20 in turn stores information about the computer 10 as that about a computer related to itself.

Then, in response to key input from the terminal 12 (at step 203), a program is started on the computer 20 (at step 204).

The above is the description of prior art operation.

After that, when the user mistakenly sets the computer 10 power switch to off (step 205), in the computer 10 the specific control instruction detecting module 3 searches the specific control instruction storage unit 2 and detects that the control instruction performing the off setting operation of the power switch is a specific control instruction likely to affect the system (at step 206).

When the input of a specific control instruction is detected, in the computer 10 the module 4 for determining the self-computer operating status determines whether or not the self-computer 10 satisfies a power OFF condition for the self-computer, i.e., the computer 10 (at step 207).

This power OFF condition for the self-computer is that of the status of the self-computer for deciding whether or not to cut off the power for the self-computer. For example, such conditions are the termination of a task activated by the user, input to or output from the terminal unit 12, and the external storage unit 11 going on, output to a printer going on if there is one connected and power OFF time passed if it is set in advance.

All or some of these conditions are specified as the power OFF conditions for a self-computer and are set in advance in the module 4 for determining the self-computer operating status.

If at step 207 it is found that such a power OFF condition for the self-computer is satisfied (step 208), then in the computer 10 the module 5 for determining the operating relationship between computers determines whether or not the self computer 10 satisfies a power OFF condition for the relation between computers (at step 209).

This power OFF condition for the relationship between computers is that of the relationship between a computer and the other computers for determining whether or not to cut off the power for the former computer. For example, when this condition is the communication of a computer with another computer being on, "NG" is established which represents the rejection of the operation for cutting off the power. Not simply communication going on, this condition may also be the use of such a resource for a computer as a user program, file and printer by another computer. "NG" is established if a resource is being used.

In this embodiment, since the computer 10 is communicating with another computer through the terminal unit 12 and since the computer 10 stores information showing that the computer 10 is related to the computer 20, the module 5 for determining the operating relationship between computers gives the decision "NG" (at step 210).

Then, in the computer 10 the module 6 for determining operating status of other computers determines whether the other computer 20 satisfies a power OFF condition for other computers (at step 211).

This power OFF condition for computers other that the self computer is that of the status of the other computers for deciding whether or not to cut off the power for the computer. For example, such conditions are the activity as a task in the computer 20 of a program started by a virtual terminal, the terminal unit 12, the staying off of the computer 20 power switch when the power of the computer 10 and that of the computer 20 are desired to be turned off at almost the same time. Like power OFF conditions for the self-computer, these conditions are specified and set in advance in the module 6 for determining operating status of other computers.

To check power OFF conditions for other computers, the computer 10 exchanges messages with the computer 20 through the transmission line 1. For example, when the computer 10 transmits a request message, the computer 20 responds to it and then sends back the status of the computer 20 related to the computer 10.

In another example, the computer 20 having information showing that the computer 20 is related to the computer 10 may periodically send the status of the related computer 20 itself as a message to the computer 10 so that the computer 10 will store the message.

When a power OFF condition for other computers is satisfied (at step 212), the computer 10 issues a power off instruction (step 213) to change the flag 7 from "1" to "0" (step 214).

This actually cuts off the power for the computer 10 (at step 215).

If during the above procedure a power OFF condition is not satisfied either for the self-computer or for other computers, the power is not cut off. Then, this process is repeated at a certain interval. This repetition may be stopped after being performed a certain number of times and then the above-mentioned three types of power off conditions may be forcibly satisfied to issue the power off instruction.

In this embodiment, as understood from the above, when any of the computers has its power OFF switch pressed, it checks the status of the other computers and then uses the result to select between executing the power off operation and delaying it. This prevents such accidents as a sudden stop of communication between computers and the occurrence of inconsistency to the resources used between computers.

The above description in reference to FIGS. 1 and 2 has been given with the emphasis laid on the virtual terminal function. The description also applies to the case of using such resources for other computers as a user program, file and printer through the transmission line 1. This case will be described hereunder.

Figures 3, 4:
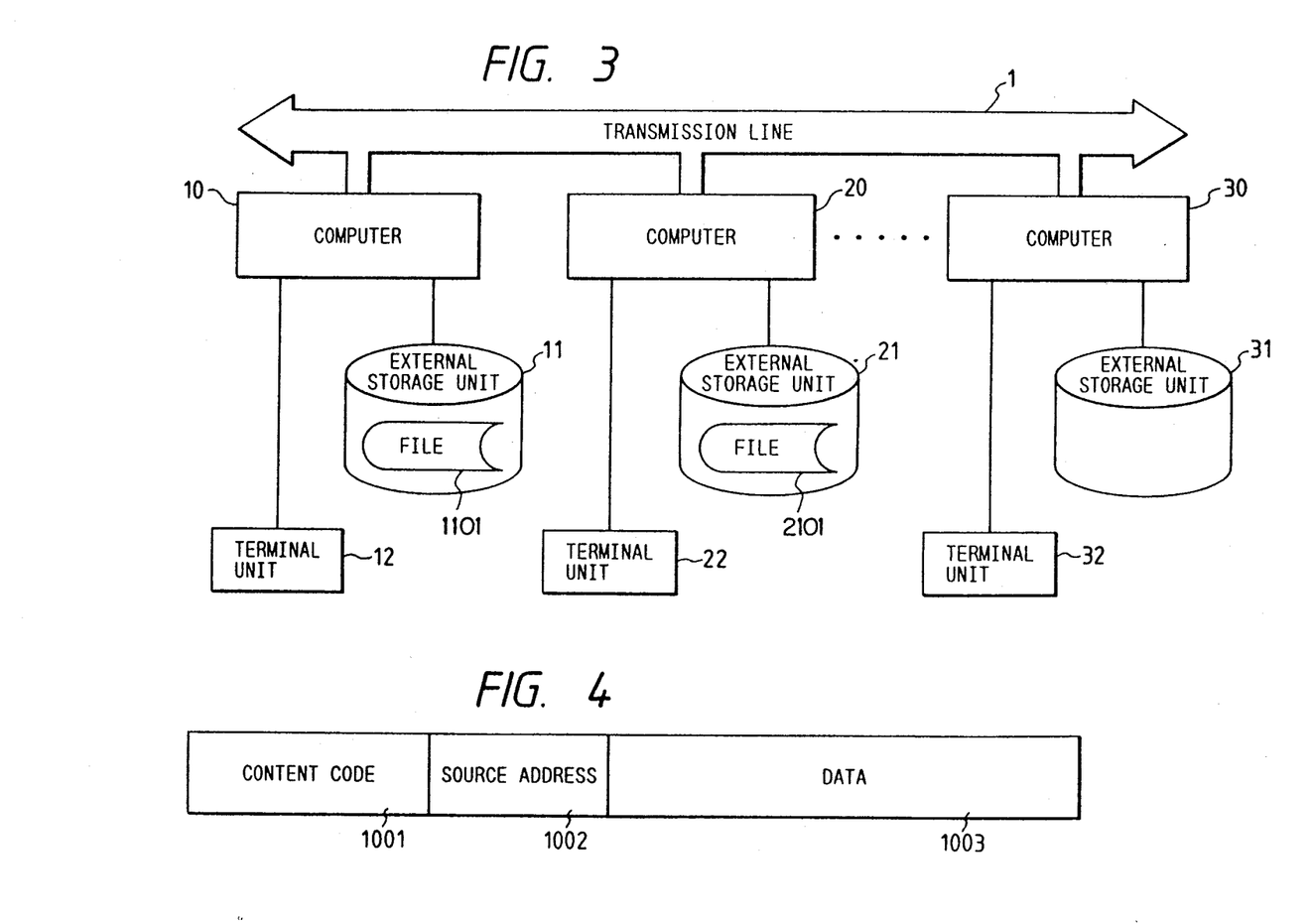
FIG. 3 is a block diagram of the configuration of a multi-computer system which is suitable for carrying out a second embodiment of the present invention.
FIG. 4 is an explanatory illustration of a composition embodying the present invention for sending data in the content code communication method in a multi-computer system according to the present invention.

FIG. 3 is a block diagram of the configuration of a multicomputer system which is suitable for carrying out a second embodiment of the present invention.

The external storage units 11 and 21 have files 1101 and 2101 respectively.

There is an occasion on which the user of a computer regards and uses these two files 1101 and 2101 as one. Now it is assumed that the file 111 has a record composed of the items, commodity code, commodity name and commodity price and that the file 211 has a record composed of the items, commodity code and sales volume. Then, when the files 1101 and 2101 are regarded as one logical file, the logical file has a record composed of the items, commodity code, commodity name, unit price and sales volume.

There is another occasion on which the files 1101 and 2101 have the same contents, namely, are multiplexed so as to update the files 1101 and 2101 at the same time.

There is still another occasion on which since a file has become too large it is split two yet desired to be accessed as one.

On these occasions it is necessary to define a plurality of physical files as one logical file.

Hereinafter, the operation will be described for defining a plurality of physical files as one logical file so that a plurality of computers can access the logical file.

When during such definition physical files are defined as one logical file and related to each other between a plurality of computers, each computer stores the name of or the communication address of another computer having a physical file related to its own.

To be more specific, the computer 10 stores information about the computer 20 which has the file 2101 related to the file 1101 on the computer 10 itself. The computer 20 in turn stores information about the computer 10 as that about a computer related to itself.

Now, as in the operation of the first embodiment shown in FIG. 2, when the power switch is set to on to turn on the power, a power on instruction is issued.

After that, it is assumed that someone sets the computer 10 power switch to off by mistake. Then, the operation is the same as that of the first embodiment shown in FIG. 2.

However, to determine at step 211 whether a power off condition for other computers is satisfied or not, it is checked in what status the related file is on another computer, and then it is decided whether or not to issue a power off instruction at step 213 shown in FIG. 2.

For example, when during the operation of file multiplexing the computer 20 goes down owing to a failure, if the power for the computer 10 is cut off, it is impossible to figure out which of the files 1101 and 2101 is a new file. Therefore, a mark indicating a new file is attached to the file 1101 before the power is cut off. Instead, a power OFF condition for the relationship between computers may be specified so that the issue of a power OFF instruction at step 213 in FIG. 2 cannot be carried out until all the processes are completed in which the computer 20 is repaired, the power is turned on, the file 2101 is made to have the same contents as those of the file 1101 and then the two files are accessed.

In another example, when the two files 1101 and 2101 are desired to be regarded as one file, the issue of a power off instruction at step 213 in FIG. 2 may be carried out only when it is verified as a power OFF condition for the self-computer that all access has been completed of the self-computer 10 to the file 1101, and also as a power OFF condition for other computers that all the access has been completed of the related computer 20 to the file 2101.

As understood from the above, even when files are used between a plurality of computers, it is possible with this embodiment to prevent such accidents as destruction of data due to a sudden cutoff of the power.

Now, a third embodiment of the present invention will be described.

In the first and second embodiments described so far in reference to the FIGS. 1 to 3, each computer stores the addresses or names of other computers related to it.

In other words, whether like a virtual terminal a computer is related to other computers in such a way that the former uses the resources for the latter or whether like file multiplexing a plurality of computers are related to each other in such a way that there are resources used between them, the computers store the addresses or names of the other computers related to them.

And when they check power OFF conditions for other computers, they communicate with them by using their addresses.

In the third embodiment, however, such an address communicating method is not used, and a communication method using content codes is used instead. Rather than the address of the receiving end, a code representing the data contents (content code) is specified for send data, and then all communication among computers is carried out on the transmission line 1 shown in FIG. 1.

The message format used in this embodiment is shown in FIG. 4.

FIG. 4 is an explanatory illustration of a composition embodying the present invention method of sending data in the content code communication in a multi-computer system according to the present invention.

The embodiment is the message format for sending data according to the present invention in the content code communication method.

Send data is composed of data 1003, a content code 1001 representing the data contents for the data 1003 and a source address 1002 representing the computer to issue the message.

The receiving end uses this content code 1001 to decide about reception and picks up only data necessary for itself. The receiving end needs to store only the content code 1001 for it to receive.

The processing operation in the third embodiment of the present invention on the basis of the content code communication method using such send data will be described hereunder.

Before the operation, a logical name is defined which is unique to a group of resources in the system. For example, in the case of the system configuration shown in FIG. 3, the files 1101 and 2101 are regarded as one logical file, and a logical name of them is defined which is unique in the system.

This definition allows the computers 10 and 20 to store the information that a file by the logical name exists on themselves, the content code 1001 given to data in order for the logical file to be accessed and the information that there are other computers. But the computers need to store no information as to which are other computers to them.

The method of accessing files given such a logical name is a known one, so its description is omitted here.

Now, it is assumed that, when the computer 20 is accessing the files 1101 and 2101 which are resources for other computers, the power switch for the computer 30 is set to off.

After checking power OFF conditions for the self-computer and for the relationship between computers, in the third embodiment, power OFF conditions for other computers are verified by specifying not the addresses but the logical name of the files 111 and 211 and then by sending a request to check the status and a response to it by using the content code 1001 representing the matters. This allows the computer 30 to obtain the information about the status of the computers 10 and 20.

Such is also the case with the setting off of the power switch for the computer 10 instead of the power switch for the computer 30. The content code communication method allows the computer 10 to obtain the information about the status of the related computers 20 and 30 and to decide whether or not to cut off the power even though no address is used.

With the first to third embodiments so far described with reference to the FIGS. 1 to 4, it is possible for a computer to specify information either about all the computers connected to the transmission line or about a group of computers connected to the line as information about computers related to itself, and thereafter to store the information as an initial value in advance.

These embodiments, on the other hand, have so far been described by assuming that the power switch is turned off by mistake. But the operation in these embodiments also applies to such cases as one in which the power is turned off when power OFF time specified in advance comes and one in which the main power turns off for such causes as a service interruption and is replaced with auxiliary power.

In addition, the operation in the embodiments applies to such a control instruction as a reset signal other than the power switch. In this case, the flags 7 and 8 are used for their corresponding control instructions.

Now, another embodiment of the present invention will be described in which the multi-computer system is a different type.

Figure 5:
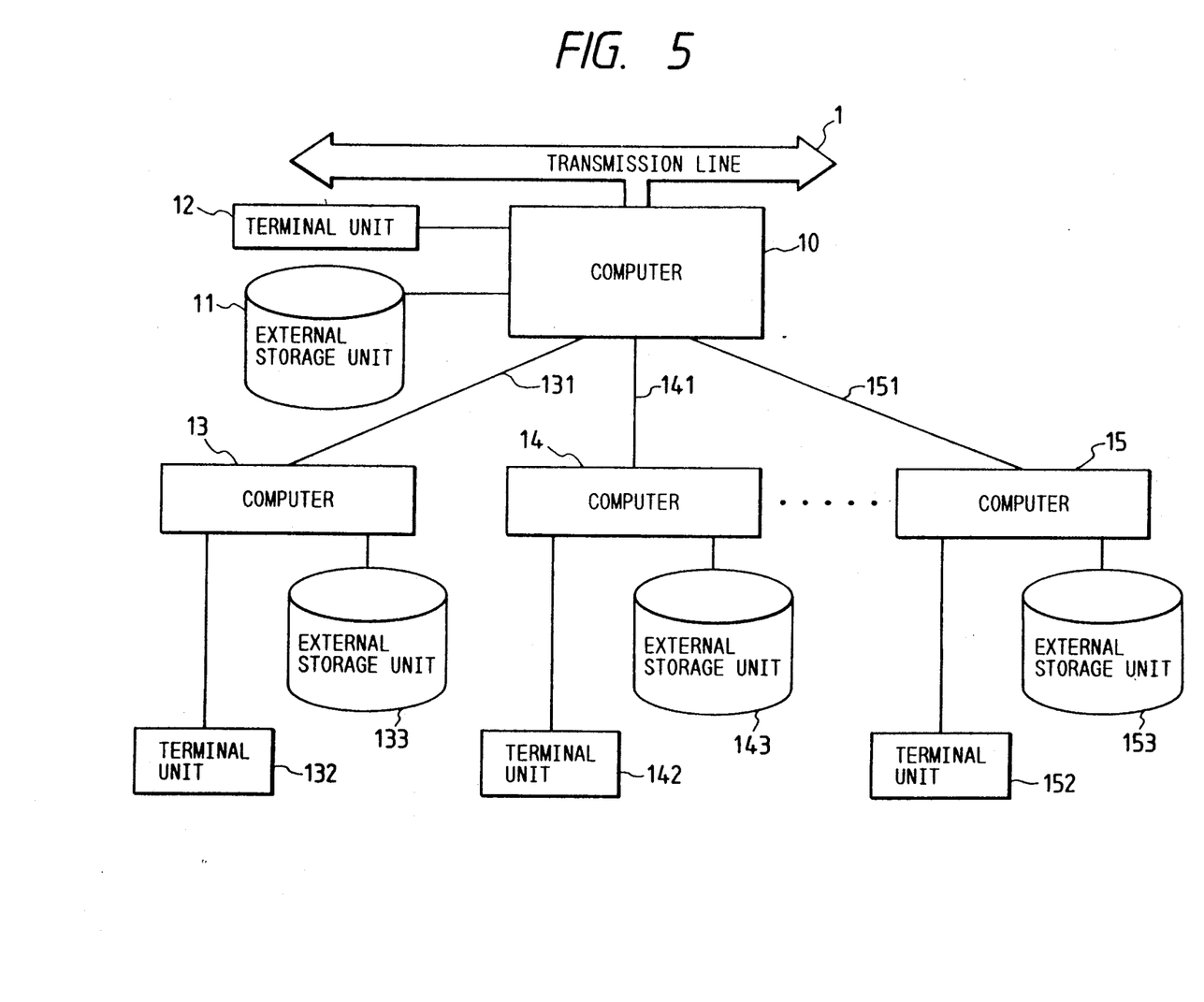
FIG. 5 is a block diagram of the configuration of a multi-computer system which is suitable for carrying out a fourth embodiment of the present invention.

FIG. 5 is a block diagram of the configuration of a multicomputer system which is suitable for carrying out a fourth embodiment of the present invention.

In this system, there is a computer 10 as a station control unit, computers 13, 14 and 15 are connected to the computer 10 through transmission lines 131, 141 and 151, respectively, and are also connected to their respective terminal units 132, 142 and 152 and external storage units 133, 143 and 153.

In this embodiment, the computer 10 may in advance handle all or some of the computer 13 to 15 as computers related to itself, and the computers 13 to 15 may in advance handle the computer 10 as another computer related to themselves.

As for operation of processing, a multi-computer system having this configuration follows the operation according to the present invention which is shown in FIG. 2, and so does a multi-computer system resulting from the combination of the systems shown in FIGS. 1 and 5.

As understood from the above description with reference to FIGS. 1 to 5, in the embodiments of the present invention, a multi-computer system in various configurations checks the status of computers related to each other to decide about the execution of such control instructions as a power off instruction and a reset instruction, which are likely to have a serious influence on the operation of the system. This makes it possible to prevent the interruption of the communication between computers and the occurrence of inconsistency to the resources used between computers.

According to the present invention, it is possible to control the execution of control instructions on the basis of the interrelation between computers connected to each other and working on performing processes through the relationship between them, and on the basis of the operating status of each computer, and thereby to improve the reliability of multi-computer systems.

We claim:

1. In a multi-computer system in which a plurality of computers connected to each other through a transmission medium share a process to be carried out through at least two of said computers, a method for executing a computer control instruction, said method comprising the steps of:
   inputting a control instruction to a first computer in said plurality of computers;
   determining in said first computer whether or not said control instruction is to be executed by consulting a storage unit to determine whether an indication of said control instruction has been stored in advance, said specific control instruction having influence on normal operation of the system;
   determining in said first computer the execution status of a process being performed in a second computer, when it is determined in the first determination step that said indication of the inputted control instruction is stored in said storage unit; and
   executing the inputted control instruction according to the execution status of said process as determined in the second determining step.

2. A method for executing a computer control instruction as claimed in claim 1 further comprising:
   said first computer detecting whether said control instruction which has just been input is the same as an indication of a control instruction stored in said storage unit; and
   determining through said transmission medium whether or not there is a process performed by said second computer, in connection with said first computer.

3. A method for executing a computer control instruction as in claim 2, further comprising:
   said first computer determining whether there is a process being performed by said second computer connected through the transmission medium; and
   determining the execution status of the process being performed by said second computer.

4. A method for executing a computer control instruction as in claim 1 further comprising:
   said first computer determining its own operating status before said step of determining the execution status of the process performed in said second computer.

5. A method for executing a computer control instruction as in claim 1, wherein an indication of a power OFF instruction to turn off the power for said first computer is stored in said storage unit and, when said result of determining the execution status of the process performed in said second computer permits execution of the power OFF instruction, the power OFF execution is performed.

6. A method for executing a computer control instruction as in claim 1, further comprising:
   when a plurality of computers share a file and a control instruction is to be executed, determining the execution status of a process performed by the computers sharing said file.

7. In a multi-computer system in which a plurality of computers connected to each other through a transmission medium share a process to be carried out through at least two of said computers, a method for said computers executing a control instruction, said method comprising the steps of:
   inputting a control instruction to a first computer in said plurality of computers;
   determining in said first computer whether or not a control instruction is to be executed by consulting a storage unit to determine whether an indication of said control instruction has been stored, said control instruction having influence on normal operation of the system;
   determining in said at least two computers the execution status of a process performed in a second computer, in connection with said first computer, it is determined that said indication of said control instruction is stored in said second storage unit; and
   executing the input control instruction in said at least two computers according to the step of determining the execution status thereof.

8. A method for executing a computer control instruction as in claim 7, further comprising:
   said first computer detecting whether said control instruction which has just been input is the same as an indication of a control instruction stored in said storage unit; and
   determining through said transmission medium whether or not there is a process performed by said second computer.

9. A method for executing a computer control instruction as in claim 7, further comprising:
   said first computer determining its own operating status before said step of determining the execution status of the process performed in said second computer.

10. A method for executing a computer control instruction as in claim 7, wherein an indication of a power OFF instruction to turn off the power for said first computer is stored in said storage unit and, when said result of determining the execution status of the process performed in said second computer permits execution of the power OFF instruction, the power OFF execution is performed.

11. A method for executing a computer control instruction as in claim 7, further comprising:
   when a plurality of computers share a file and a control instruction is to be executed, determining the execution status of a process performed by the computers sharing said file.

* * * * *